United States Patent
Tholkes et al.

(10) Patent No.: US 9,133,974 B2
(45) Date of Patent: Sep. 15, 2015

(54) COMPUTER LIFT

(75) Inventors: Alan L. Tholkes, Prior Lake, MN (US); DuWayne Dandurand, Jordan, MN (US)

(73) Assignee: HealthPostures, LLP, Burnsville, MN (US)

( * ) Notice: Subject to any disclaimer, the term of this patent is extended or adjusted under 35 U.S.C. 154(b) by 245 days.

(21) Appl. No.: 13/606,634

(22) Filed: Sep. 7, 2012

(65) Prior Publication Data

US 2013/0126682 A1    May 23, 2013

Related U.S. Application Data (60) Provisional application No. 61/532,787, filed on Sep. 9, 2011.

(51) Int. Cl.
| | |
|---|---|
| F16M 11/04 | (2006.01) |
| A47B 21/02 | (2006.01) |
| A47B 9/12 | (2006.01) |
| A47B 9/10 | (2006.01) |
| F16M 11/18 | (2006.01) |
| A47B 21/03 | (2006.01) |
| F16M 11/28 | (2006.01) |
| F16M 13/02 | (2006.01) |

(52) U.S. Cl.
CPC .............. *F16M 11/046* (2013.01); *A47B 9/10* (2013.01); *A47B 9/12* (2013.01); *A47B 21/02* (2013.01); *A47B 21/0314* (2013.01); *F16M 11/04* (2013.01); *F16M 11/18* (2013.01); *F16M 11/28* (2013.01); *F16M 13/022* (2013.01); *F16M 2200/048* (2013.01); *Y10T 29/49826* (2015.01)

(58) Field of Classification Search
CPC ... F16M 11/04; F16M 11/018; F16M 11/046; A47B 9/10; A47B 9/12; A47B 21/02; A47B 21/0314
USPC ................................ 248/123.11, 295.11, 919
See application file for complete search history.

(56) References Cited

U.S. PATENT DOCUMENTS

| | | | | |
|---|---|---|---|---|
| 1,460,714 | A * | 7/1923 | Fritts | 355/59 |
| 4,559,879 | A * | 12/1985 | Hausser | 108/136 |
| 4,651,652 | A * | 3/1987 | Wyckoff | 108/147 |
| 5,114,109 | A * | 5/1992 | Fitz et al. | 248/404 |
| 5,421,549 | A * | 6/1995 | Richards | 248/163.2 |
| 6,352,226 | B1 * | 3/2002 | Gordon | 248/125.2 |
| 6,663,298 | B2 * | 12/2003 | Haney | 396/419 |
| 6,735,820 | B1 * | 5/2004 | Teutsch | 16/72 |
| 7,204,193 | B2 * | 4/2007 | Scherrer et al. | 108/43 |
| 7,364,124 | B2 * | 4/2008 | Yuasa et al. | 248/125.8 |
| 7,646,425 | B2 * | 1/2010 | Bohaker et al. | 348/373 |

(Continued)

FOREIGN PATENT DOCUMENTS

| | | | | |
|---|---|---|---|---|
| DE | 1529723 | * | 2/1970 | |
| DE | 19730194 | A1 * | 1/1999 | A47B 17/00 |

(Continued)

*Primary Examiner* — Terrell McKinnon
*Assistant Examiner* — Eret McNichols
(74) *Attorney, Agent, or Firm* — Daniel J. Polglaze; Westman, Champlin & Koehler, P.A.

(57) ABSTRACT

A computer lift has a stationary lift assembly and a movable monitor mount containing a gas spring cylinder fixed at one end, using a pulley assembly and cable to double the stroke of the gas spring cylinder by floating the pulley assembly. A positive lock allows the lift to stay in position after moving to a desired height, while maintaining easy movability.

14 Claims, 13 Drawing Sheets

(56) References Cited

U.S. PATENT DOCUMENTS

| | | | |
|---|---|---|---|
| 7,743,716 B1* | 6/2010 | Burka | 108/147 |
| 7,752,932 B2* | 7/2010 | Chen et al. | 74/89.22 |
| 8,177,174 B2* | 5/2012 | Griepentrog | 248/125.2 |
| 8,269,884 B2* | 9/2012 | Overstreet | 348/375 |
| 8,333,159 B2* | 12/2012 | Schroer et al. | 108/147 |
| 8,342,465 B2* | 1/2013 | Koder | 248/188.5 |
| 8,371,237 B2* | 2/2013 | Weber | 108/97 |
| 2002/0186317 A1* | 12/2002 | Kayanuma | 348/373 |
| 2003/0146425 A1* | 8/2003 | Drake et al. | 254/264 |
| 2004/0226485 A1* | 11/2004 | Scherrer et al. | 108/43 |
| 2007/0055116 A1* | 3/2007 | Clark et al. | 600/300 |
| 2007/0252919 A1* | 11/2007 | McGreevy | 348/825 |
| 2008/0250989 A1* | 10/2008 | Kozlowski et al. | 108/147 |
| 2009/0219436 A1* | 9/2009 | Overstreet | 348/373 |
| 2010/0187380 A1* | 7/2010 | Koder | 248/188.5 |
| 2011/0155867 A1* | 6/2011 | Griepentrog | 248/125.2 |
| 2011/0233350 A1* | 9/2011 | Burgess et al. | 248/123.11 |
| 2012/0227642 A1* | 9/2012 | Sekikawa | 108/147 |
| 2012/0248273 A1* | 10/2012 | Singer | 248/297.11 |
| 2013/0314852 A1* | 11/2013 | Kincaid et al. | 361/679.01 |
| 2014/0034799 A1* | 2/2014 | Fallows et al. | 248/297.21 |

FOREIGN PATENT DOCUMENTS

| | | | | |
|---|---|---|---|---|
| DE | 10253362 A1 | * | 5/2004 | A47B 91/02 |
| DE | 19626854 B4 | * | 7/2006 | |
| EP | 2746640 A2 | * | 6/2014 | |
| WO | WO 9919247 A1 | * | 4/1999 | B66F 7/00 |

* cited by examiner

FIG. 12

COMPUTER LIFT

This application claims the benefit of U.S. Provisional Application No. 61/532,787, filed on Sep. 9, 2011, hereby incorporated herein in its entirety by reference.

FIELD

The present disclosure relates generally to computer lifts and in particular the present disclosure relates to adjustable height lifts for computers.

BACKGROUND

As more and more workers use computers for large portions of a workday, more problems associated with improperly placed keyboards, monitors, and the like can cause health issues. Health issues that may arise from improper keyboard and/or monitor height include back problems, neck problems, wrist problems, circulation problems, and the like. As awareness of the benefits of proper ergonomic placement of computer monitors and keyboards continues to improve, the shortcomings of many monitor and keyboard stands are becoming more and more apparent.

Other monitor mounts capable of supporting a large monitor use a series of a plurality of pulleys, and typically require adjustment with tools so that the amount of tension provided in the lift equals the weight on the lift. If a user leans on any platform of the lift, or changes the weight so that it is heavier or lighter, the lift will move. Other lifts use a counter-weight that may also require adjustment, or only work for a monitor of a certain weight, or within a very small weight range.

For the reasons stated above, and for other reasons stated below which will become apparent to those skilled in the art upon reading and understanding the present specification, there is a need in the art for an improved computer monitor and keyboard lift.

DETAILED DESCRIPTION

In the following detailed description of the embodiments, reference is made to the accompanying drawings that form a part hereof. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present disclosure is defined only by the appended claims, along with the full scope of equivalents to which such claims are entitled.

Figure 1:
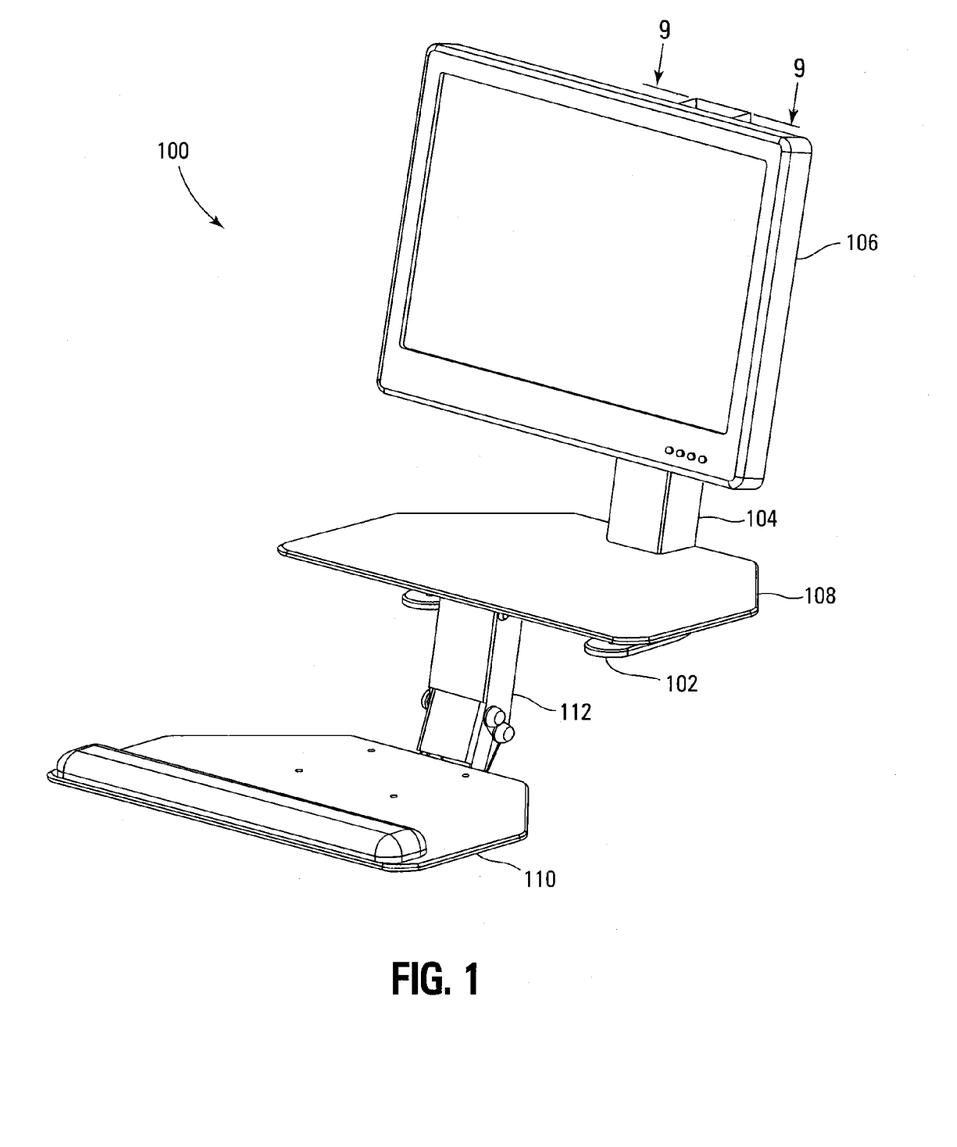
FIG. 1 is a perspective view of a computer lift according to one embodiment of the present disclosure.
Figure 2:
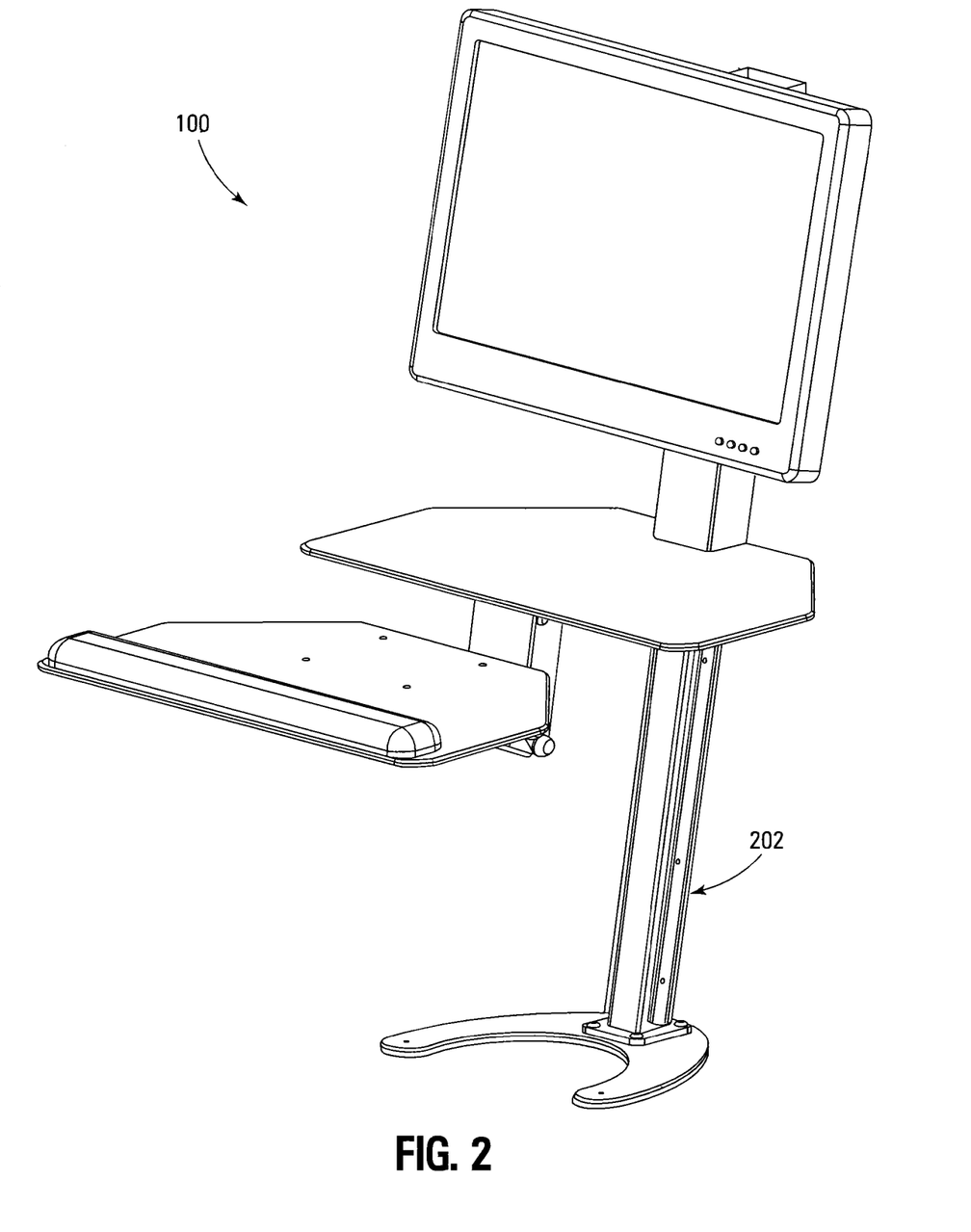
FIG. 2 is a perspective view of the computer lift of FIG. 1 in an extended position.

FIG. 1 is a perspective view of a computer lift 100 according to one embodiment of the present disclosure. The computer lift 100 is shown in FIG. 1 in a lowered position. As shown in FIG. 2, the computer lift can be extended to an upper position. Various other positions between the lower position and the upper position may also be used.

Referring to FIG. 1, the computer lift 100 comprises a base 102 supporting a movable monitor mount 104. The monitor mount 104 in turn supports a monitor 106 or other display device, and a platform 108, from which a keyboard rest 110 is supported via support 112. As shown in greater detail in perspective view in FIG. 2 and in side elevation view in FIG. 3, the monitor mount 104 is slidably movable on a lift assembly 202 attached to the computer lift base 102, and which extends within a hollow center of the monitor mount 104.

Figure 3:
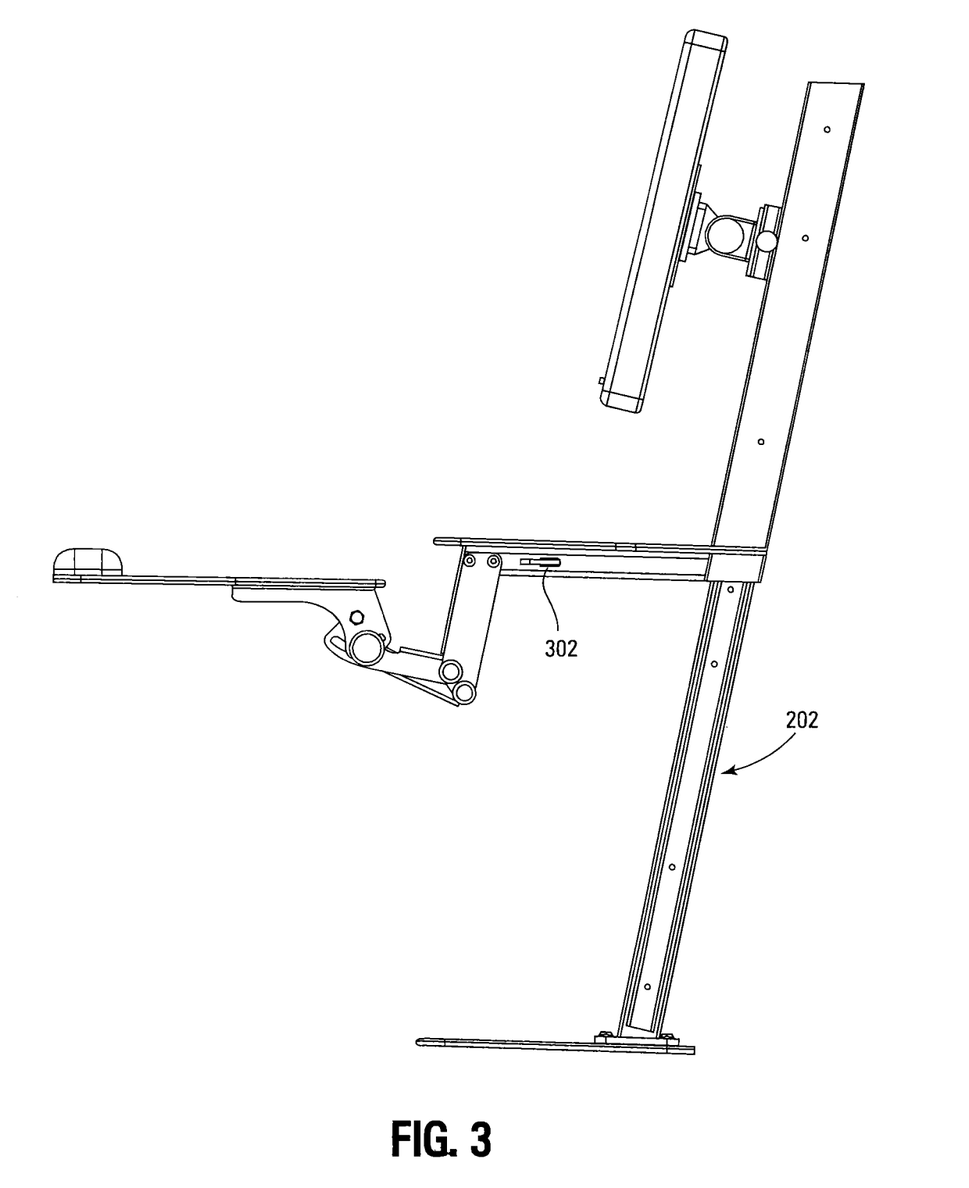
FIG. 3 is a side elevation view of the computer lift of FIG. 2.
Figure 4:
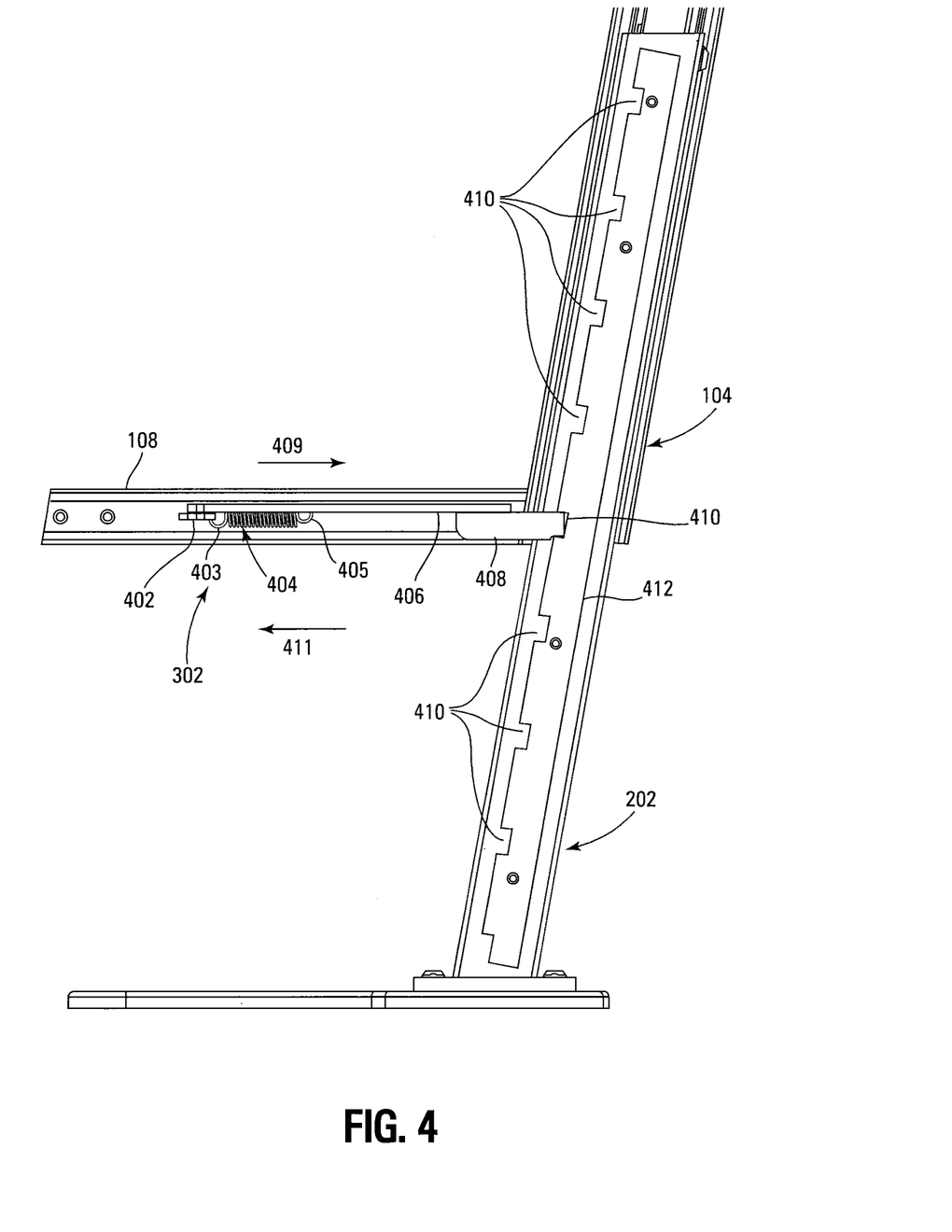
FIG. 4 is a partial cutaway side elevation of a computer lift according to another embodiment of the present disclosure.

Also in FIG. 3, positive locking mechanism 302 is shown. Further detail of positive locking mechanism 302 is provided in FIG. 4. Positive locking mechanism 302 allows for the monitor mount 104 to be positively locked in one of a plurality of positions of raised or lowered monitor/display and keyboard. Positive locking mechanism 302 in one embodiment comprises a spring attachment 402 connected between one end 403 of a spring 404 and a lock arm 406. The lock arm is in turn connected to lock 408. The spring 404 is attached as mentioned at end 403 to the lock arm 406. The other end 405 of the spring 402 is attached to the platform 108. The spring is normally biased to urge the lock arm and lock 408 toward the locking bar 412 of lift assembly 202 in the direction of arrow 409, so as to engage the lock 408 into one of a plurality of detents 410 formed in locking bar 412 of lift assembly 202. The locking mechanism 302 is in one embodiment disengaged by using a handle or the like attached to the lock arm 408, the spring attachment 402, or the like to allow a user to overcome the normal spring bias of spring 404 and disengage the lock 408 from a detent 410 by moving the lock arm 406 and therefore the lock 408 in a direction indicated by arrow 411.

Figure 5:
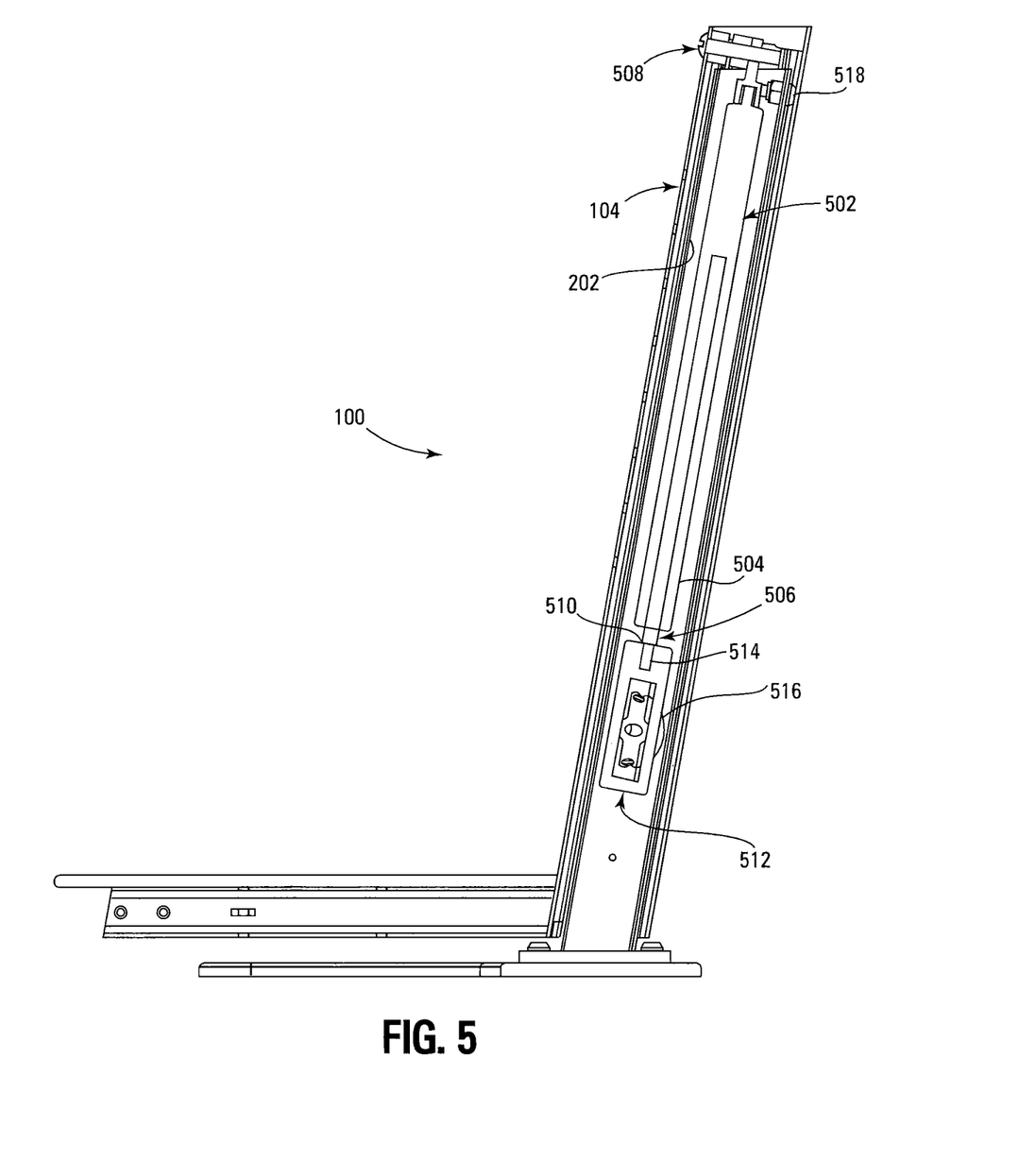
FIG. 5 is a partial cutaway side elevation of a computer lift according to another embodiment of the present disclosure.
Figure 6:
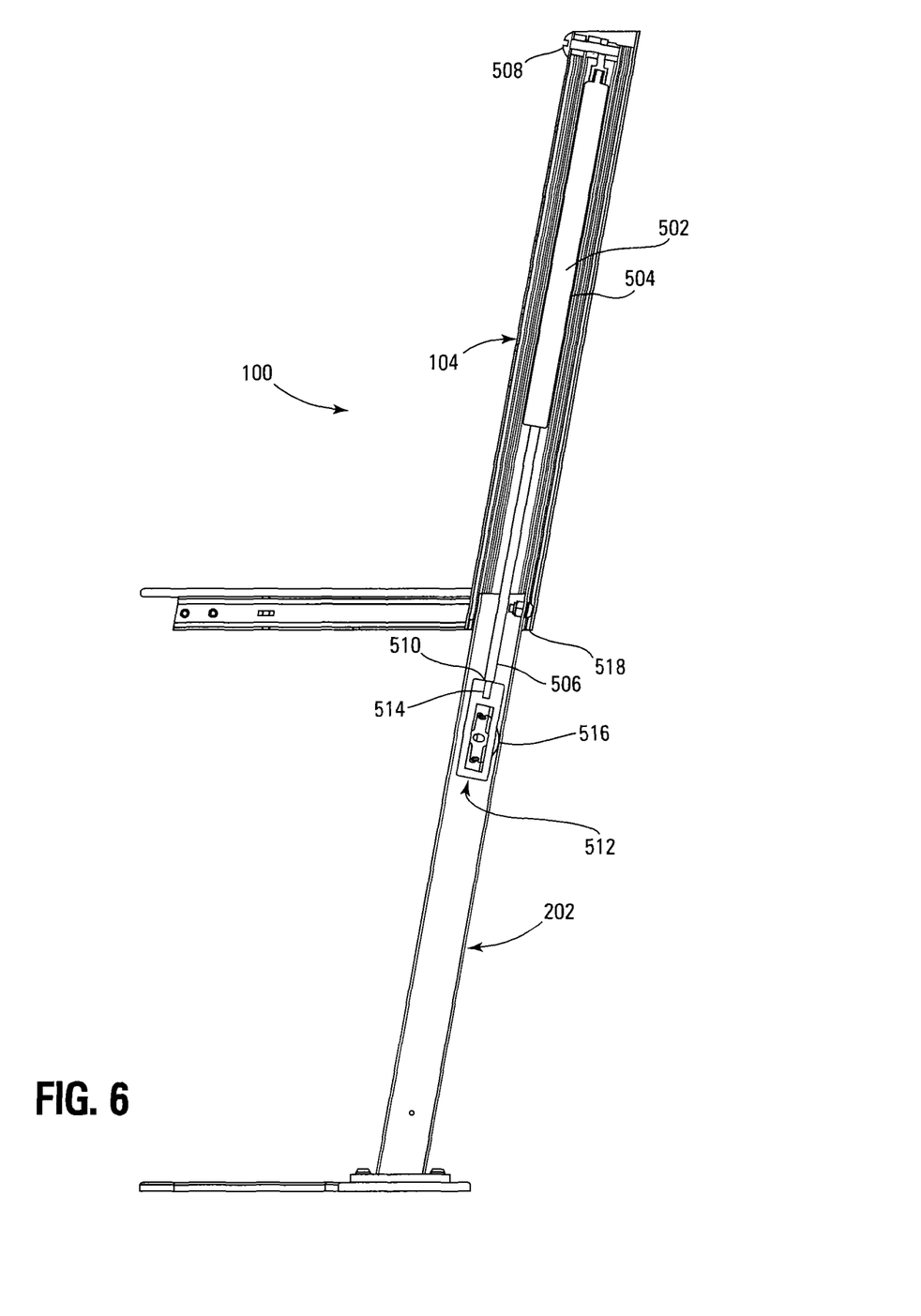
FIG. 6 is a partial cutaway side elevation of the computer lift of FIG. 5 in an extended position.

Further detail of the lift assembly 202 and its interaction with the monitor mount 104 is shown in FIGS. 5 and 6, which show, respectively, the lift 100 in partial cutaway side view in a lowered (FIG. 5) and raised (FIG. 6) positions. In the lowered position shown in FIG. 5, a gas spring cylinder 502 having a main body 504 and an inner cylinder 506 is shown. Gas spring cylinder 502 is attached to the monitor mount 104 at attachment point 508. Inner cylinder 506 is attached at its distal end 510 to a pulley case 512, for example by threaded engagement with a recessed threaded portion 514 of case 512. Pulley case 512 contains a pulley 516 mounted within pulley case 512 to be freely rotatable within pulley case 512. Pulley cable 702 (shown in greater detail in FIGS. 7 and 8) is attached at one end at attachment point 508, threaded through the pulley case 512 around pulley 516, and to attachment point 518 on lift assembly 202. As seen in FIG. 6, the gas spring cylinder 502 is in an extended position, where the inner cylinder 506 is extended from the main body 504 when the upright is in its upper, or raised, position.

While the gas spring cylinder 502 is attached to the monitor mount at attachment point 508, the pulley case 512 and inner cylinder 506 are free-floating within the monitor mount 104 and lift assembly 202. This allows for a doubling of the stroke of the gas spring cylinder, since the pulley case 512 and the distal end of the gas spring cylinder are floating. This doubling of the stroke allows for a greater range of motion of the monitor mount than simply using a gas spring cylinder that is fixed at each end. The gas spring pressure keeps the cable 702 from getting slack during movement of the monitor mount 104 from its lowered position to its raised position.

The gas spring in the computer lift with the pulley and cable combination allows for travel of the monitor mount 104 approximately twice the stroke of a spring of the gas spring cylinder 502. There is no force required for raising or lifting the monitor mount 104, as the force is counterbalanced by the force of the cylinder. Therefore, no adjustment is required for moving the monitor mount 104 since the cylinder 502 does a majority of the work.

Further, the use of the pulley/cylinder system allows for the height of the lift assembly to be shorter than traditional designs. In one embodiment, the computer lift, when mounted to a standard working height desk/table/surface is adjustable to fit a user from 62 inches up to 76 inches in height.

Figure 7:
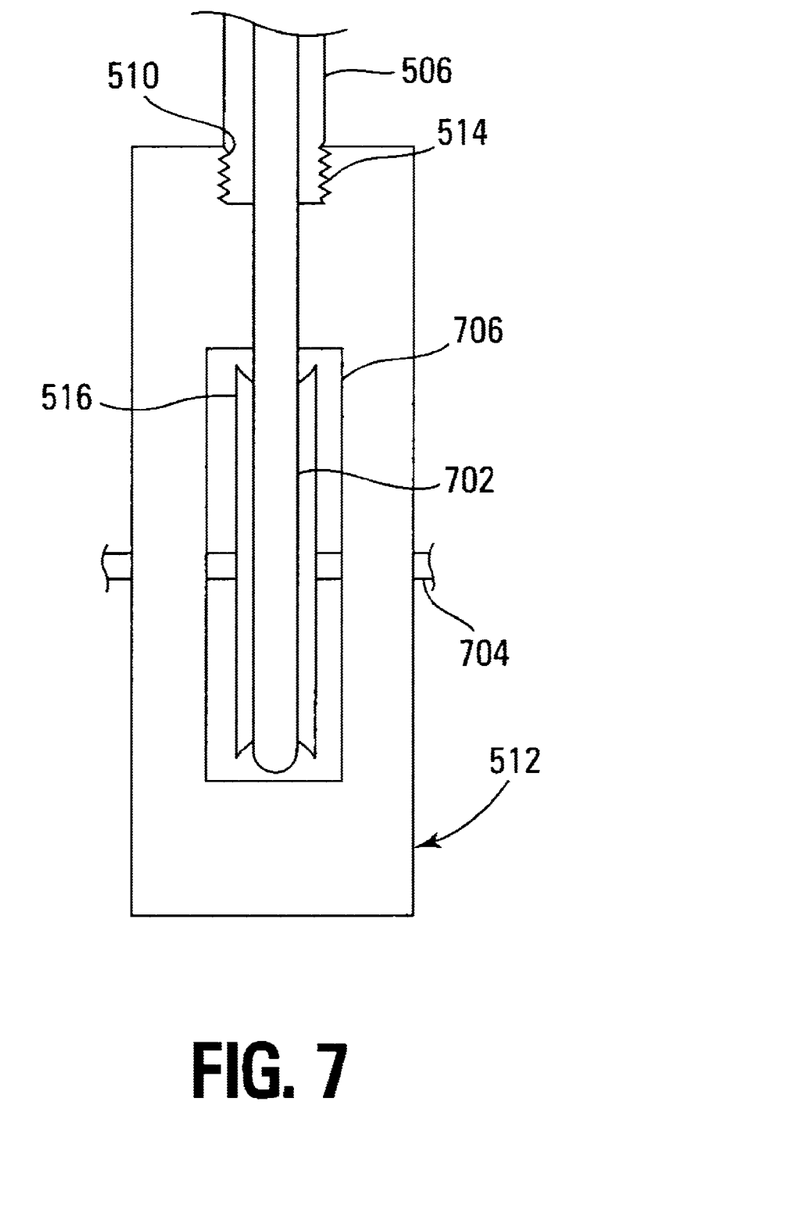
FIG. 7 is a view of a pulley case according to an embodiment of the present disclosure.
Figure 8:
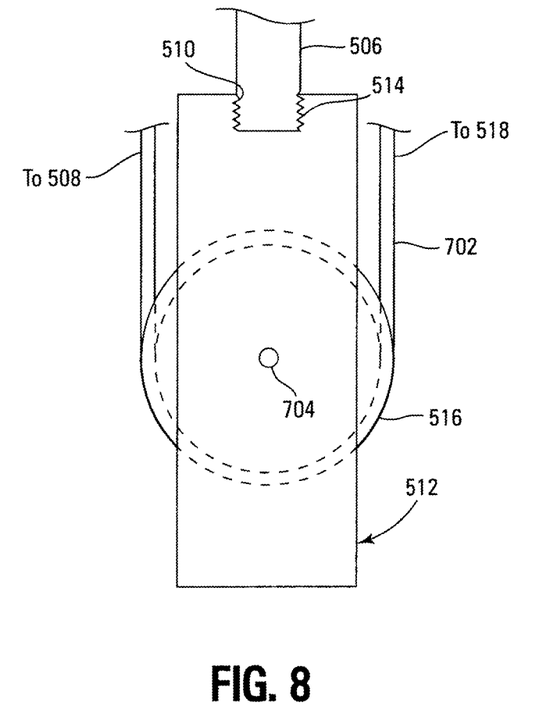
FIG. 8 is another view of the pulley case of FIG. 7.

As may be seen referring also to FIGS. 7 and 8, pulley 516 extends in one embodiment through slots 706 in the wall of the pulley case 512, allowing the cable 702 to be seated on the pulley 516 securely so that it does not slip off pulley 516.

Figure 9:
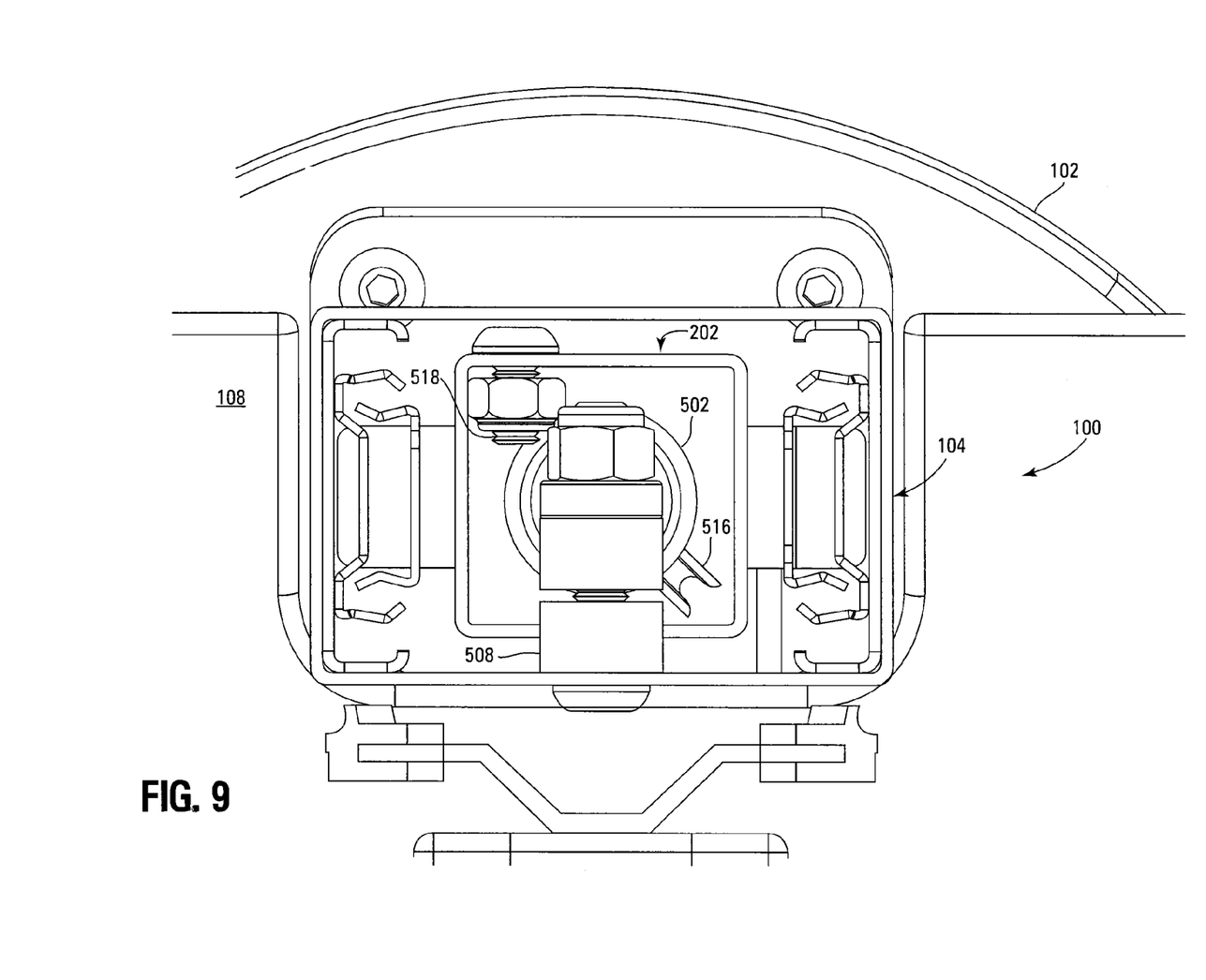
FIG. 9 is a view taken along lines 9-9 of FIG. 1.

A top cutaway view of the lift assembly 202 and monitor mount 104 is shown in FIG. 9. The view is taken along the lines 9-9 of FIG. 1. The attachment points 508 and 518, as well as gas cylinder 502, pulley 516, lift assembly 202 and monitor mount 104 are shown.

Figure 10:
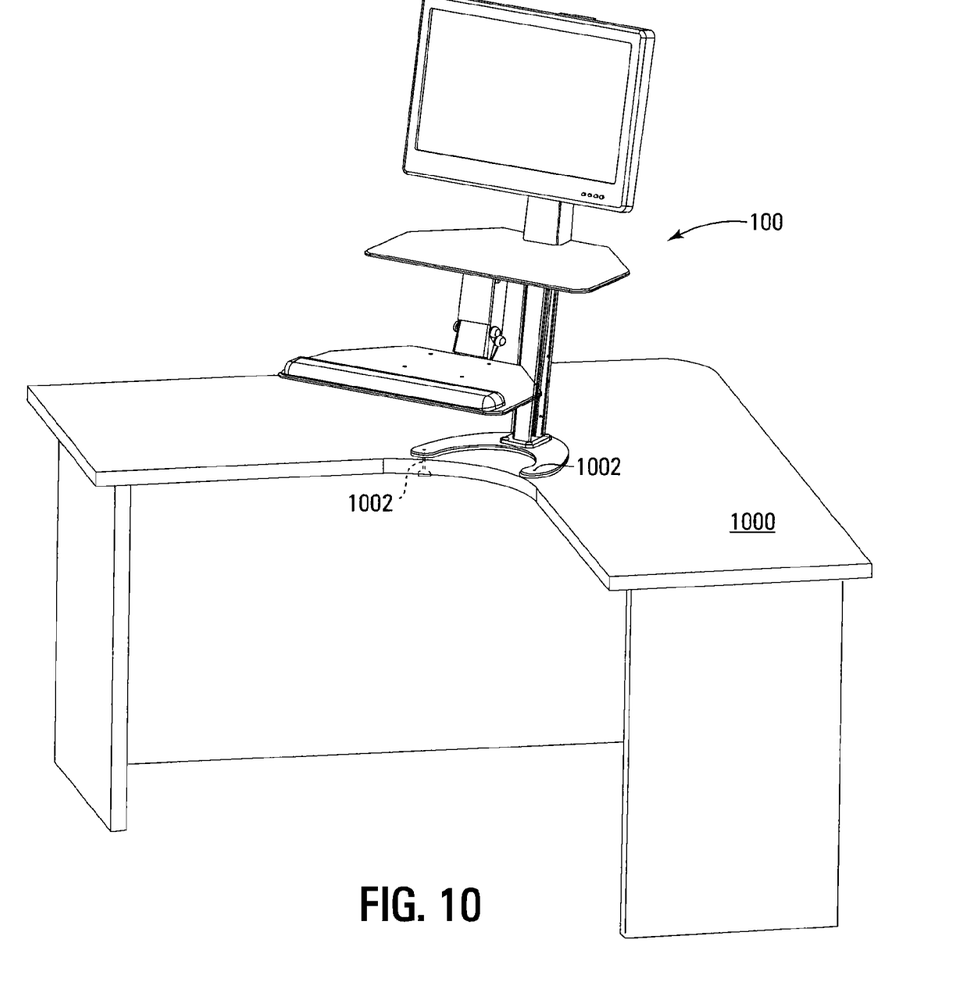
FIG. 10 is a view of a mounting of a computer lift.
Figure 11:
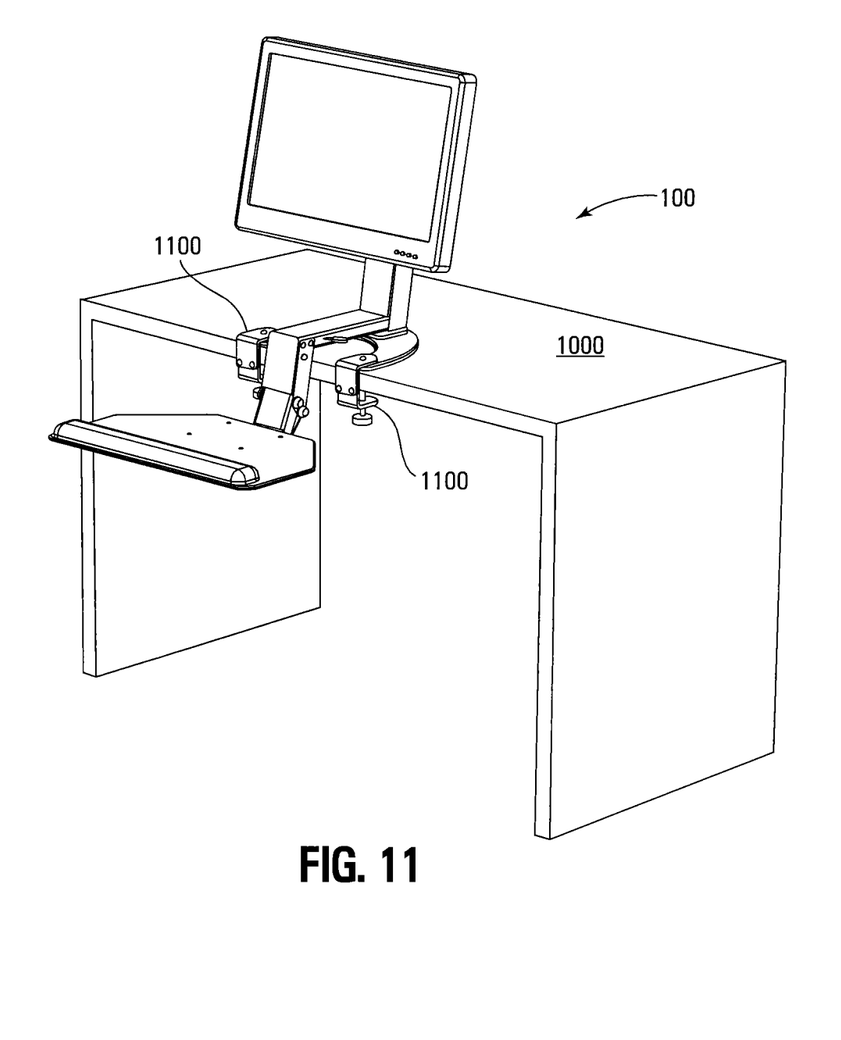
FIG. 11 is a view of an alternate mounting of a computer lift.
Figure 12:
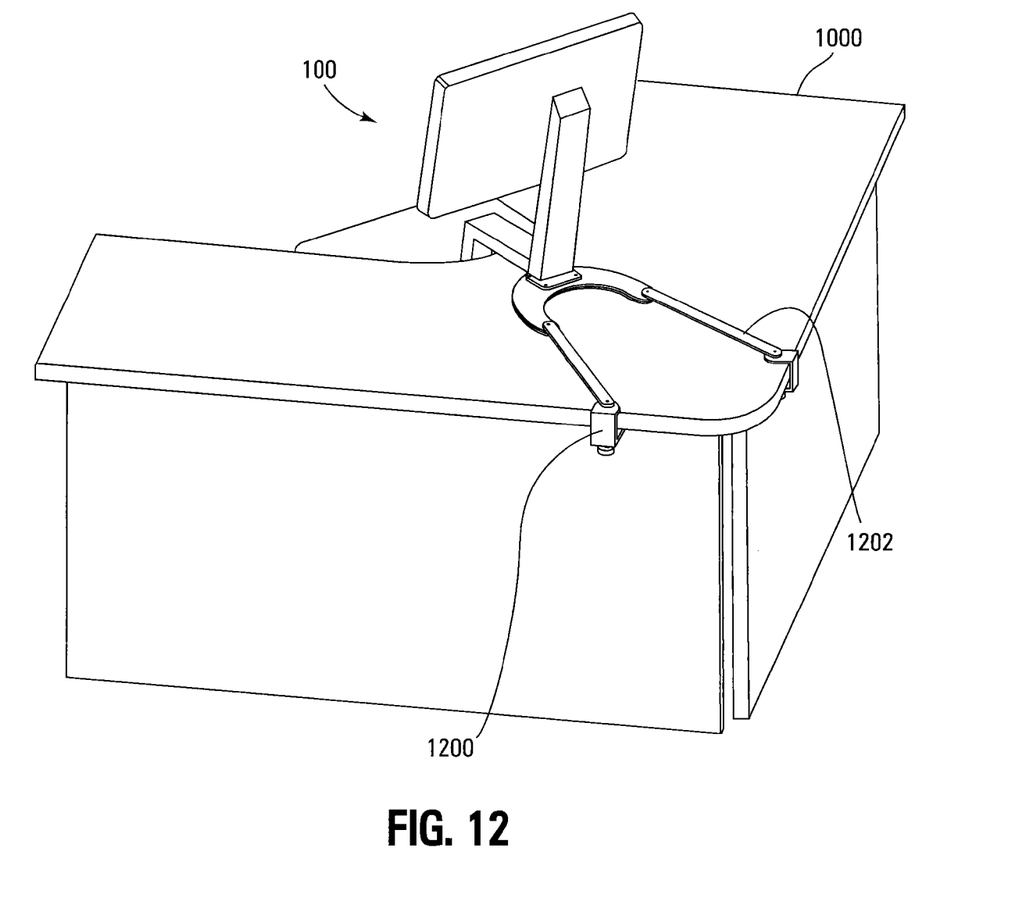
FIG. 12 is a view of another alternate mounting of a computer lift.
Figure 13:
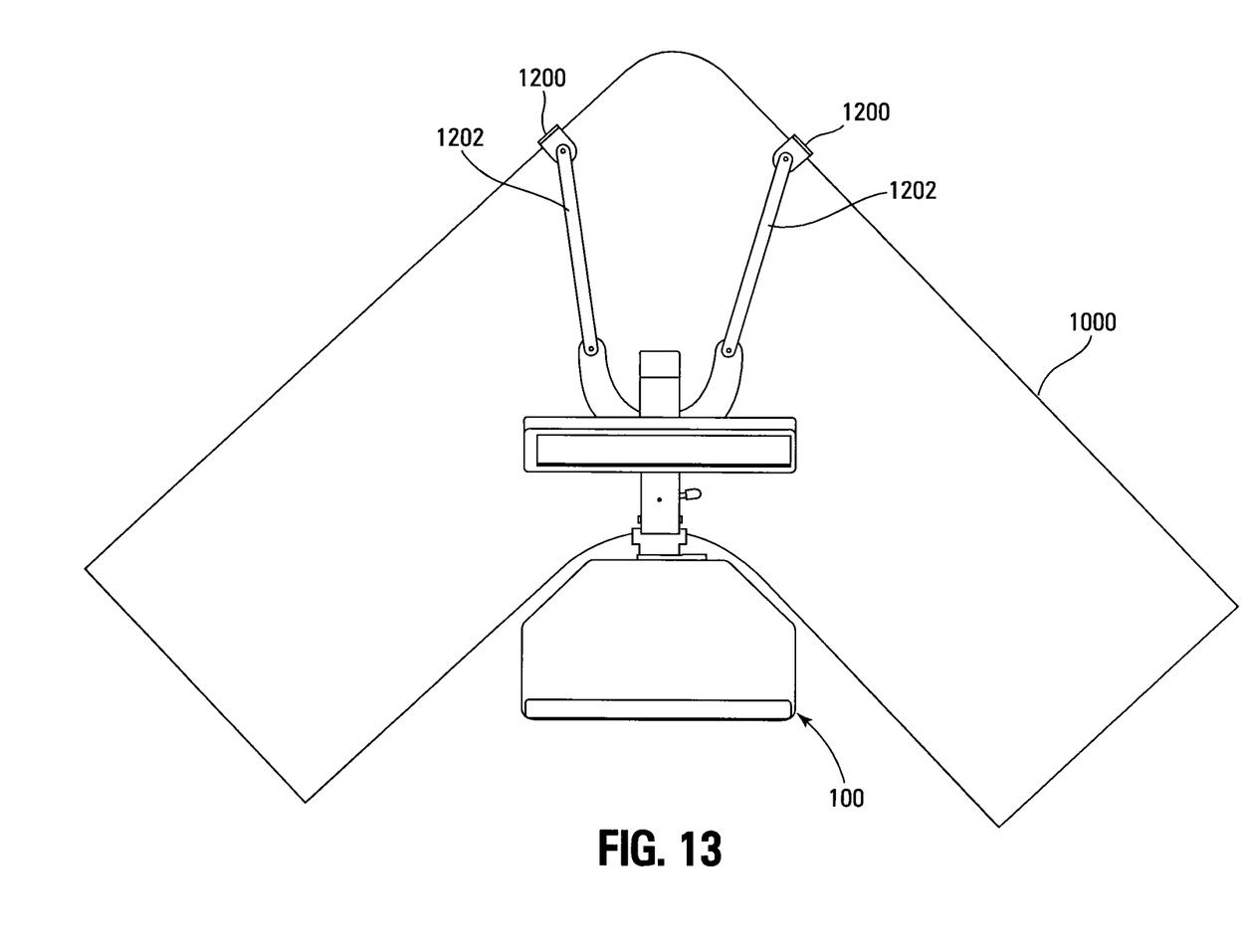
FIG. 13 is a top view of the mounting of FIG. 12.

The computer lift 100 of the present disclosure is amenable to mounting to a desk or other surface in a number of ways, allowing for flexibility in mounting. Various mounting embodiments are shown in FIGS. 10-13. For example only, and not by way of limitation, FIG. 10 shows a mounting where the computer lift 100 is attached directly to a desk/table/surface 1000 via a mounting fastener such as screws, bolts or the like 1002. FIG. 11 shows a mounting where the computer lift 100 is mounted to a desk/table/surface 1000 using a plurality of clamps 1100 in a front-mount embodiment. FIGS. 12 and 13 shown a mounting where the computer lift 100 is mounted to a desk/table/surface 1000 using a plurality of clamps 1200 at a rear of the desk/table/surface connected to the computer lift 100 by extending bars, straps, or the like 1202. In another alternative mounting, a VELCRO type system for mounting may be used.

CONCLUSION

Computer lift embodiments have been described that include a computer lift with a smaller height profile than existing computer lifts. This is accomplished using a gas spring cylinder, pulley, and cable system allowing the doubling of the stroke of the gas spring cylinder using a fixed mounting at one end of the gas spring cylinder and a floating second end of the gas spring cylinder. The computer lift Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A computer lift, comprising:
    a base having a lift assembly;
    a monitor mount slidably movable on the lift assembly;
    a lift system comprising:
        a gas spring cylinder having an outer cylinder and an extendable inner cylinder, the outer cylinder connected at a first end to the monitor mount;
        a pulley case having a pulley, the pulley case mounted to the inner cylinder at a second end of the gas spring cylinder; and
        a cable fixed at a first cable end to the first end of the gas spring cylinder and at a second cable end to the lift assembly, and between the first cable end and the second cable end, through the pulley case and seated in the pulley; and
    a locking mechanism coupled between the monitor mount and the lift assembly to selectively lock the monitor mount in one of a plurality of positions, wherein the locking mechanism comprises:
        a spring coupled to the monitor mount; and
        a lock coupled between the spring and the lift assembly, the spring normally biased toward the lift system.

2. The computer lift of claim 1, and further comprising:
    a keyboard rest, the keyboard rest connected to and supported by the lift assembly.

3. The computer lift of claim 1, wherein the lift system further comprises a locking bar attached to a frame of the lift system, the locking bar having a plurality of detents to accept the lock to hold the monitor mount in one of the plurality of positions.

4. The computer lift of claim 3, wherein the locking mechanism further comprises a handle, the handle to allow a user to overcome the normally biased spring to allow movement of the monitor mount.

5. The computer lift of claim 1, wherein the pulley is mounted within the pulley case to be freely rotatable within the pulley case.

6. The computer lift of claim 1, wherein the pulley extends through slots in the pulley case to allow the cable to be seated on the pulley securely.

7. The computer lift of claim 1, and further comprising:
    a mounting mechanism for mounting the computer lift to a solid surface, the mounting mechanism having a plurality of clamps to engage the solid surface.

8. The computer lift of claim 7, wherein the plurality of clamps clamp to a front edge of the solid surface.

9. The computer lift of claim 7, wherein the plurality of clamps clamp to a rear edge of the solid surface.

10. The computer lift of claim 9, wherein the plurality of clamps are connected to the computer lift with a plurality of extension bars, an extension bar for each clamp.

11. A method of lifting a monitor on a monitor mount, comprising:
    attaching an outer tube of a gas spring cylinder at one end to a movable monitor mount;
    attaching a pulley system to an end of an inner tube at a distal end of the gas spring cylinder;
    attaching one end of a cable at the one end to the movable monitor mount, and at a second end of the cable to a stationary lift assembly, with the cable seated in a pulley of the pulley system between the cable ends;
    moving the monitor mount between a first position and a second position of a plurality of positions; and locking the monitor mount into one of the plurality of positions with a locking mechanism, wherein locking comprises locking into a detent of a locking bar of the monitor mount with a spring connected between the monitor mount and a lock, the spring normally biased toward the monitor mount.

12. The method of claim 11, wherein moving the monitor mount comprises moving a distance of double a stroke of the gas spring cylinder.

13. The method of claim 11, wherein moving the monitor between the first position and the second position moves the monitor a distance approximately twice a length of extension of an inner cylinder of the gas spring cylinder.

14. A computer lift, comprising:
   a monitor mount;
   a lift assembly, the lift assembly comprising:
      a gas spring cylinder having an outer cylinder and an inner cylinder, the outer cylinder connected to the monitor mount at a first point, and the inner cylinder connected to a pulley case with a rotatable pulley therein; and
      a pulley cable connected between the first point and a second point on the lift assembly, the pulley cable threaded therebetween over the pulley; and
   a locking mechanism coupled between the monitor mount and the lift assembly to selectively lock the monitor mount in one of a plurality of positions, wherein the locking mechanism comprises:
      a spring coupled to the monitor mount; and
      a lock coupled between the spring and the lift assembly, the spring normally biased toward the lift system.

* * * * *